(12) United States Patent
Carrillo et al.

(10) Patent No.: US 9,326,541 B2
(45) Date of Patent: May 3, 2016

(54) PET TREAT

(75) Inventors: David Carrillo, Cincinnati, OH (US); Kenneth Bowman, Alta Loma, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 13/191,150

(22) Filed: Jul. 26, 2011

(65) Prior Publication Data

US 2013/0029011 A1  Jan. 31, 2013

(51) Int. Cl.
| | | |
|---|---|---|
| A23K 1/00 | (2006.01) |
| A23K 1/16 | (2006.01) |
| A23K 1/18 | (2006.01) |
| A23G 3/20 | (2006.01) |
| A23B 4/00 | (2006.01) |
| C12C 5/04 | (2006.01) |
| A23L 1/31 | (2006.01) |
| A23L 1/315 | (2006.01) |
| A23L 1/30 | (2006.01) |
| A23L 1/314 | (2006.01) |
| A23K 1/10 | (2006.01) |
| A23K 1/14 | (2006.01) |

(52) U.S. Cl.
CPC .............. *A23L 1/3152* (2013.01); *A23K 1/003* (2013.01); *A23K 1/10* (2013.01); *A23K 1/14* (2013.01); *A23K 1/1603* (2013.01); *A23K 1/1606* (2013.01); *A23K 1/1631* (2013.01); *A23K 1/1634* (2013.01); *A23K 1/1643* (2013.01); *A23K 1/1853* (2013.01); *A23L 1/3103* (2013.01); *A23L 1/31454* (2013.01)

(58) Field of Classification Search
CPC . A23L 1/3152; A23L 1/3103; A23L 1/31454; A23K 1/003; A23K 1/10; A23K 1/14; A23K 1/1603; A23K 1/1606; A23K 1/1631; A23K 1/1634; A23K 1/1643; A23K 1/1853
USPC .......................................... 426/282, 72, 250, 92
See application file for complete search history.

(56) References Cited

U.S. PATENT DOCUMENTS

| | | | | |
|---|---|---|---|---|
| 3,384,978 | A | * | 5/1968 | Cox .................................. 34/92 |
| 5,449,281 | A | * | 9/1995 | Dupart et al. .............. 425/131.1 |
| 5,673,653 | A | | 10/1997 | Sherrill |
| 5,695,797 | A | * | 12/1997 | Geromini et al. ................ 426/62 |
| 5,895,662 | A | | 4/1999 | Meyer |
| 6,584,938 | B2 | | 7/2003 | Sherrill et al. |
| 7,082,894 | B2 | | 8/2006 | Sherrill et al. |

(Continued)

FOREIGN PATENT DOCUMENTS

| | | |
|---|---|---|
| EP | 1500333 A1 | 1/2005 |
| EP | 2090183 A1 | 8/2009 |
| WO | 2008/003140 A1 | 1/2008 |

OTHER PUBLICATIONS

Zuke's Available online at www.zukes.com on Jun. 20, 2009.*

(Continued)

*Primary Examiner* — Erik Kashnikow
*Assistant Examiner* — Assaf Zilbering
(74) *Attorney, Agent, or Firm* — Banner & Witcoff, Ltd.

(57) ABSTRACT

Provided are treats having an outer portion and an inner portion which contains a filling. The filling may include ground or diced meat and further includes additional ingredients for health benefits or palatability. The treats are highly palatable to pets and therefore very well-suited to delivery of health ingredients.

19 Claims, 3 Drawing Sheets

(56) References Cited

U.S. PATENT DOCUMENTS

2002/0155195 A1* 10/2002 Gannon .................. 426/74
2010/0255155 A1    10/2010 Stone

OTHER PUBLICATIONS

"Chicken Breast Roll". Available online at www.palachinkablog.com on Dec. 7, 2009.*

Database GNPD [Onlne] Mintel; Anonymous: "Biscuits for Dogs", retrieved from www.gnpd.com, dated Aug. 1, 2009.
Database GNPD [Online] Mintel; Anonymous: "Mixed Snack Dog Snack", retrieved from www.gnpd.com, dated Feb. 11, 2005.
Database GNPD [Online] Mintel; Anonymous, "Dog Treats", retrieved from www.gnpd.com, dated Dec. 11, 2005.
International Application No. PCT/US2012/048390—International Search Report and Written Opinion dated Nov. 28, 2012.

* cited by examiner

PET TREAT

BACKGROUND

Humans have been feeding treats to their pets for many years. The treats may be provided as a reward to a pet to promote desirable behaviors. Pet treats are typically rapidly consumed by the pets. Accordingly, treats have been viewed purely as a reward and are generally not considered to confer benefits on the consuming pet.

Chicken jerky in the form of dried chicken breasts has been used for many years as a pet treat due to its high palatability to pets. The chicken jerky treats have been sprinkled with a powder containing glucosamine and chondroitin in an attempt to help dogs with their joints or been sprinkled with a powder containing a mix of cinnamon, rosemary, and parsley in an attempt to make a dog more calm. Additionally, jerky treats have been coated with a barbeque baste or a teriyaki baste in an attempt to make the jerky treats more palatable. However, the prior art embodiments with the powder coatings and baste coatings have had drawbacks. In one drawback, both the powder coatings and the baste coatings can scrape or wear off in the package. Additionally, the baste coatings are susceptible to staining the carpets of the pet owners. Accordingly, there is still a need in the market for a pet treat with an improved flavoring and/or for conferring health benefits on the pet.

SUMMARY

In an aspect of this invention, an edible treat is disclosed. The treat includes an outer unitary piece of dried meat having an outer perimeter and an opening extending therethrough defining an inner perimeter. The treat also has a dried inner filling attached to the inner perimeter.

In another aspect, a package comprising a first and a second edible treat is disclosed. Each treat includes an outer unitary piece of dried meat having an outer perimeter and an opening extending therethrough defining an inner perimeter and each treat has a dried inner filling attached to the inner perimeter. The inner filling of the first and second treats have materially different compositions or appearances.

In yet another aspect, a method of preparing an edible treat is disclosed. The method includes providing a meat chip from a meat source, removing a center portion of the meat chip to provide an outer unitary piece of meat having an opening extending therethrough, and filling the opening with an inner filling to create an uncooked treat and drying the uncooked treat.

DETAILED DESCRIPTION

Figure 1B:
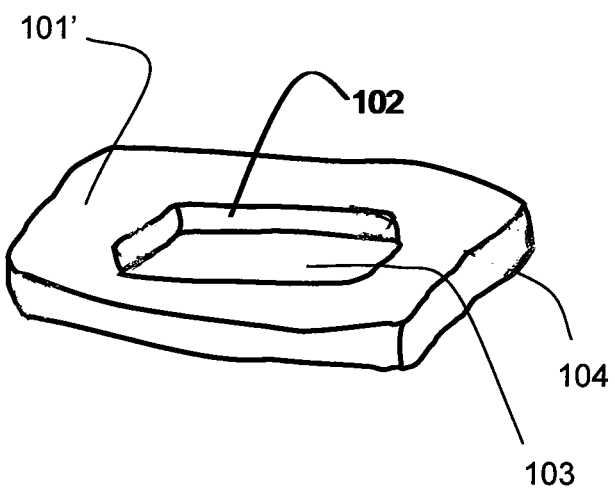
FIG. 1B is a top perspective view of the outer portion of the pet treat shown in FIG. 1A, depicted in a state during the manufacturing process.
Figure 1A:
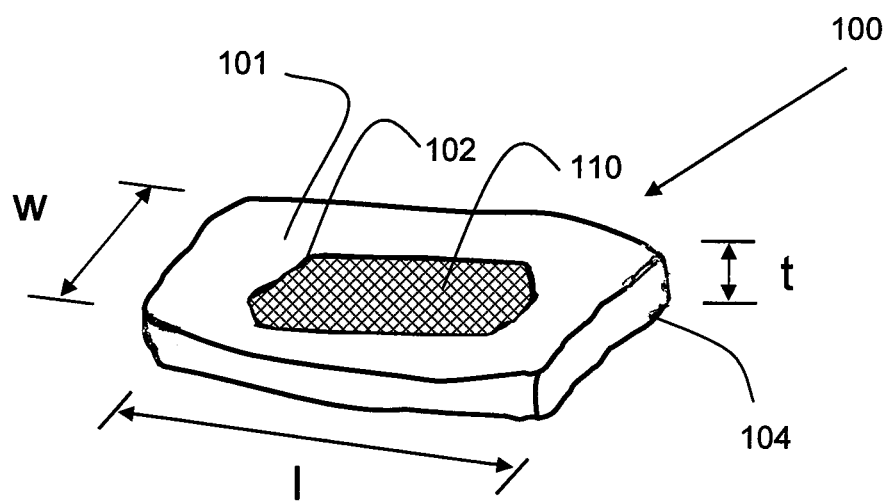
FIG. 1A is a top perspective view of a pet treat having according to an embodiment of the present disclosure.

Referring now to FIGS. 1A-3, a pet treat for carnivorous animals, e.g., domestic dogs, is shown along with a method for making, and a set or package of pet treats. Referring initially to FIG. 1A, the pet treat is designated generally by reference numeral 100. As shown in the figures, the treat 100 includes an outer portion 101 having an outer perimeter 104 and an inner perimeter 102. The inner perimeter 102 bounds an inner opening 103 which is present during the manufacture process of treat 100. FIG. 1B shows the outer portion 101 with opening 103 prior to it being filled with filler 110. The inner opening 103 of the treat 100 is filled with an inner filling 110.

In an illustrative arrangement as shown, the outer portion 101 is a unitary member that completely encases the inner opening 103 on its sides. That is, the outer portion 101 forms a complete unbroken perimeter around the inner opening 103. The center portion 110 is thus bounded around its perimeter but is exposed at the top and bottom of the treat 100.

In one arrangement, the dried meat on the outer portion 101 is formed of a dried unitary piece of meat. In a first embodiment, the outer portion 101 is a unitary piece of dried chicken meat. However, in alternative embodiments, the outer portion 101 is a unitary piece of beef, pork, duck, or lamb.

In contrast to the unitary piece of meat of outer portion 101, the center portion 110 is formed by an inner filling of a dried mixture as described hereinafter. Typically, the mixture for the inner filling 110 includes ground or finely diced meat. In fact, the inner filling may contain at least 50% meat by weight in one embodiment, at least 70% meat by weight in another embodiment, at least 75% meat by weight in another embodiment, at least 80% meat by weight in another embodiment, at least 90% meat by weight in another embodiment, or at least 95% meat by weight in another embodiment. The ground or diced meat used for filling can be chicken, pork, beef, duck, lamb, or a combination thereof.

In a first embodiment, the meat type in the outer portion 101 is the same meat type as in the filling of the center portion 110. For example, the outer portion 101 is a unitary piece of chicken meat and the inner portion 110 includes diced or ground chicken meat. In this embodiment, the main difference in ingredient composition between the inner portion 110 and the outer portion 101 is the additives included in the mixture for forming the inner portion 110. In an alternative embodiment, the meat type in the outer portion 101 is a different meat type as in the filling of the center portion 110. For example, in another embodiment, the outer portion 101 is a unitary piece of chicken meat and the inner portion 110 includes diced or ground pork meat.

The inner filling 110 may further include a variety of additives in the composition suitable to enhance palatability and/or add health benefits. For example, to enhance palatability, the inner filling 110 may include, for example, salami, liver paste, peanut butter, sweet potato, or cheese. However, alternative desirable and suitable flavor ingredients may be added in lieu of peanut butter, sweet potato, or cheese.

In addition, or in lieu of, an ingredient to enhance palatability, inner filling 110 may further include one or more health ingredients mixed in with the inner filling suitable to provide health benefits. Suitable health ingredients include ingredients that promote dental care, skin and coat health, activity, digestive care, immunity, and/or general health balance. The quantities of these other ingredients can be any suitable amount and are not critical for the treat.

Some embodiments contain one or more health ingredients selected from the group consisting of glucosamine, chondroitin, flax seed, calcium, parsley seed, peppermint, chlorophyll, vitamin E, L-carnitine, and lycopene.

In some embodiments, probiotic bacteria may be included as a health ingredient. For example, the probiotic bacteria may include one or more species of the genus *Lactobacillus*, and/or one or more species of the genus *bifidobacterium*, B.

*animalis* for example. Optionally, prebiotic ingredients may be included to promote growth and survival of the probiotic bacteria. For example, suitable prebiotics include fructooligosaccharides (FOS), xylooligosaccharides (XOS), galactooligosaccharides (GOS), soy oligosaccharides, and inulin. Prebiotic ingredients may be obtained from a variety of sources such as soybeans, Jerusalem artichoke, jicama, and chicory root.

The health ingredient may be in any suitable form to confer the benefit of the health ingredient on the pet. For example, in some embodiments, the ingredient may be a fat or oil purified from a suitable source. In other embodiments, the health ingredient may be in the form of an extract from an herb or a plant. In yet other embodiments, the health ingredient may be isolated from an animal source. In some embodiments entire seeds may be used. The seeds may be substantially intact or minimally processed.

For example, in an embodiment to promote dental care for the pet by providing breath freshening and cleaner teeth, the inner filling includes parsley seed. The parsley seed may be in the form of one or more of an oil and an extract. The inner filling may further include minerals, sodium copper chlorophyllin, chlorophyll and/or sodium bicarbonate mixed in with the meat filling and the parsley seed. It is also contemplated to use peppermint, in addition to or in lieu of, the parsley seed.

In another example, in an embodiment to promote skin and coat health for the pet, the inner filling includes flax seed and/or flax seed oil with brewer's yeast mixed therein. In an alternative embodiment, the inner filling includes vitamin E mixed therein in addition to, or in lieu of, the flax seed and/or flax seed oil with brewer's yeast.

In another example, in an embodiment to promote joint care for the pet and/or activity of the pet, the inner filling includes glucosamine and/or chondroitin mixed therein. The inner filling may further include green lipped mussel powder and/or shrimp shell powder mixed in with the meat filling and the glucosamine and/or chondroitin. In an alternative embodiment, the inner filling includes calcium mixed therein in addition to, or in lieu of, the glucosamine and/or chondroitin. In an alternative embodiment, the inner filling includes L-carnitine mixed therein in addition to, or in lieu of, the glucosamine and/or chondroitin.

In another example, in an embodiment to promote digestive care for the pet, the inner filling includes chicory root powder mixed therein. The inner filling may further include licorice root, yucca extract, parsley seed oil, slippery elm and/or ginger mixed in with the meat filling and the chicory root powder. In an alternative embodiment, the inner filling includes probiotics and/or prebiotics and/or chlorophyll mixed therein in addition to, or in lieu of, the chicory root.

In another example, in an embodiment to promote immunity for the pet, the inner filling includes grape pomace, sea buckthorn, and/or tea extracts mixed therein. In an alternative embodiment, the inner filling includes Lycopene mixed therein in addition to, or in lieu of, the grape pomace, sea buckthorn, and/or tea extracts.

In another example, in an embodiment to promote general health balance for the pet, the inner filling includes green tea extract mixed therein. The inner filling may further include ginger, valerian root powder, and/or chamomile powder mixed in with the meat filling and the green tea extract.

Color ingredients, also known as colorants or digestible dyes, may also be added to the inner filling. Preferably, the colorant is approved for addition to a foodstuff. The colorant can be helpful to aid the user in the selection of a particular treat. For example, a green color additive may be included to help identify to the pet owner that the specific treat promotes health benefits and having health-based additives. A yellow or orange-based color additive may be included to help identify to the pet owner that the treat is cheese flavored. A brown-based color additive may be included to help identify to the pet owner that the treat is peanut butter flavored. This can be particularly beneficial if the treats are offered in a multi-pack having different varieties. A chart or other indicia may be provided on the product packaging to indicate to purchaser/pet owner the correspondence between the color of the filling and the flavor or health additive of the respective treat.

The treats disclosed herein provide several advantages. First, in contrast to treats having powders sprinkled onto the treat surface that are susceptible to being blown, shaken, or scraped off the disclosed treats, the flavoring and/or health additive of the pet treat 100 is integrally mixed with filling of the center portion 110 and will remain with the treat 100. Further, when treats are coated with a baste, the baste can be lost due to abrasion with the packaging or through handling. The treats 100 described herein do not suffer from the same problems. Further, a purchaser can see that there is a color ingredient added to the treat. Moreover, particular additives may be associated with particular colorants allowing a purchaser to quickly identify the appropriate treat to supply a particular additive ingredient.

The disclosed treats are particularly useful for delivery of unpalatable health ingredients because the outer portion and the inner filling, with or without a flavor additive, combine to mask from the pet any off-flavor associated with the health ingredients. Accordingly the treats disclosed herein provide a delivery device for health ingredients that is well received by the pet.

Further, because the outer portion is a unitary piece of meat that completely surrounds the central portion containing the inner filling, the treats have improved structure that minimizes flaking and breaking off, reducing waste due to loss of the inner filling.

In addition, the treat is high in protein. Typically, in the depicted embodiment, each treat contains at least 60% protein. Additionally, the treat embodiment is also low in fat, which is present in a range of 4.0% to 5.0%; and a moisture content under 20%, commonly in the moisture range of 7% to 12%. The treat is low in fiber, which is present at about 0% to 2%. Typically, the amount of fiber is less than 0.5%.

Optionally, a humectant to regulate moisture content may be added to the treat. A humectant is an agent that absorbs water. Any suitable humectant may be selected from those in the art, including glycerin and collagen. Additionally, any suitable amount of a humectant may be added, for example, at a range of 1% to 5% by weight.

Collagen is inherently present in the outer portion 101 and in the meat of the inner 110. When the treat dries or is otherwise heated during its cooking process, the collagen creates a bond between the inner portion 110 and the outer portion 101 at the inner perimeter 102 of the unitary piece of dried meat. The bond allows the inner filling to attach to the inner perimeter, preventing the inner filling from falling out of the outer unitary meat piece. Thus, in some embodiments, particularly those having an inner filling containing chicken, the inner filling may need no additional binders to maintain good structure and prevent the inner filling from detaching from the outer unitary meat piece.

In the depicted embodiment, the inner filling 110 is preferably a homogenous mixture. The term "homogenous" as used herein means having a generally uniform structure, distribution or composition throughout. Alternatively, in other embodiments the inner filling is not homogenous. For example, non-homogenous filling may contain pieces having a texture different from chicken distributed throughout the filling to achieve desirable effects in flavoring, dental benefits, and the like.

The treats may be sized to suit different sized pets. According to the embodiment of FIG. 1, the pet treat 100 is substantially wafer-shaped in that it has area footprint much greater in relationship to its thickness. According to the embodiment as shown in FIG. 1, the treat 100 has a length "1", a width "w", and a thickness "t". In one range of embodiments, the treat 100 has an average length 1 between 3-7 cm, an average width between 1.5 to 4.5 cm, and an average thickness t between 0.1 to 1.0 cm. In a specific embodiment, the treat 100 is approximately 5.5 cm by 2.8 cm, with an average thickness of about 0.5 cm thick. Other embodiments have variants by plus or minus 10% for each of these dimensions. It is also recognized that the treat 100 need not be rectangular in shape and alternative configurations can be used.

In an alternative and larger-sized treat 100, in one range of embodiments, the treat 100 has an average length 1 between 14-20 cm, an average width between 3 to 9 cm, and an average thickness t between 0.1 to 1.0 cm. In a specific embodiment, the treat 100 is approximately 17 cm by 6 cm, with an average thickness of about 0.5 cm thick. Other embodiments have variants by plus or minus 10% for each of these dimensions.

Further, in the depicted embodiment, the treat 100 is relatively flat. "Relatively flat" is defined herein as having a relationship where the square root of the surface area (i.e. the length "l" multiplied by the width "w" for a rectangular shaped treat) is at least 8 times the average thickness "t" of the treat.

Figure 2:
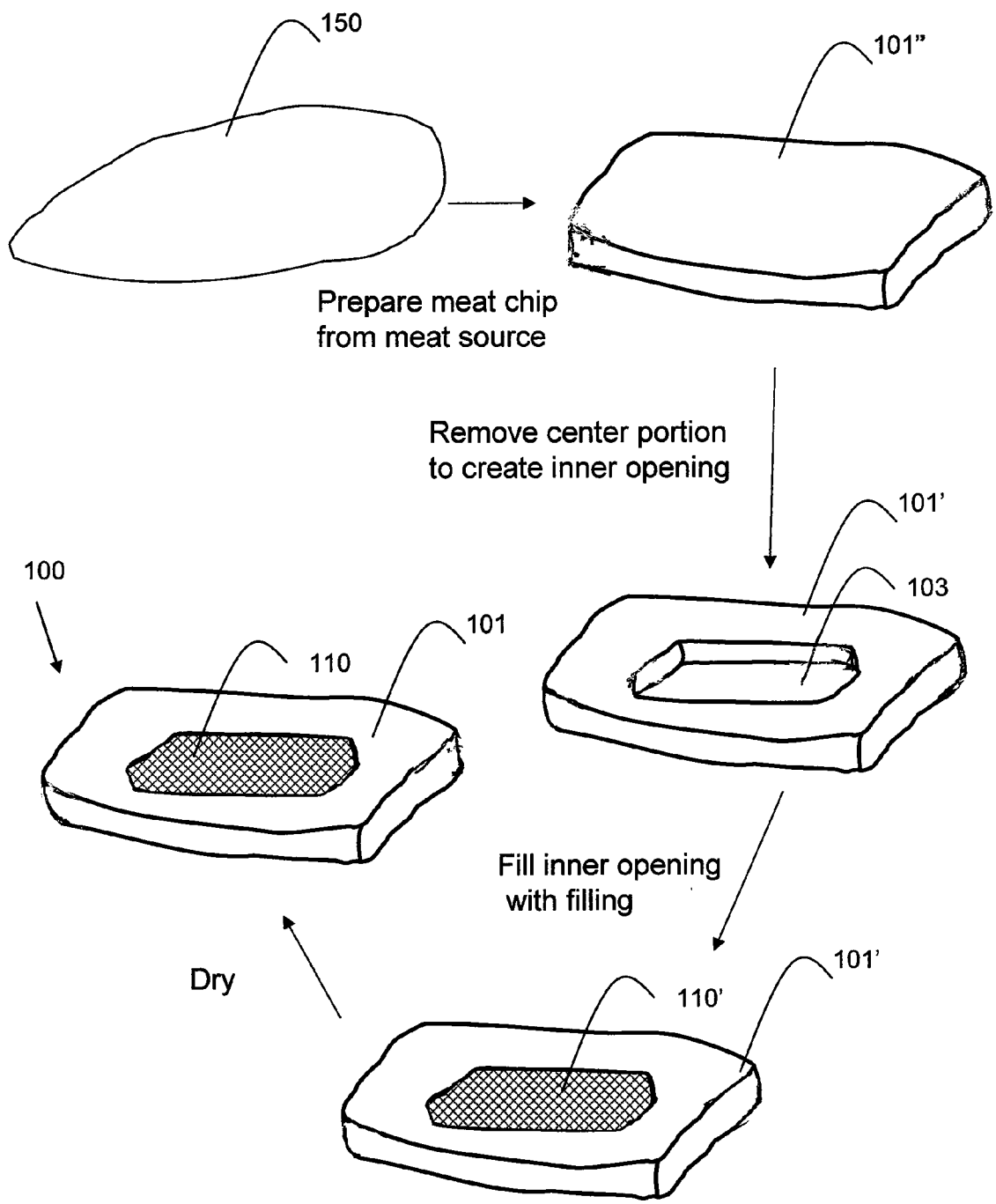
FIG. 2 schematically illustrates a manufacturing process for the pet treat shown in FIG. 1A.

FIG. 2 schematically illustrates a method of how the pet treat 100 can be manufactured. The process is started with a piece of meat 150. At this stage, the meat is un-dehydrated. As described above, the meat 150 may be chicken, beef, pork, duck, lamb, or another suitable type of meat. The meat is then optionally pounded flat and then cut into a size slightly larger than the size of the treat 100 to obtain pre-process version of the outer portion 101". From this state, the center portion of the meat chip is removed to create an opening 103. This results in an un-dehydrated outer portion 101' as shown in FIG. 1B having an unbroken perimeter around the opening 103. The center portion may be removed in any desirable manner for example by cutting with a knife or a stamping with a cutting edge to create an opening 103 of a desired size and shape. The removed portion is retained and may be used as desired. In one method, the removed center portions are processed by grinding or fine dicing, optionally with other ingredients, to form the filling, as later described. Therefore, the removed meat from the center is diced and/or ground and is used as part of the mixture to provide the filling 110. Accordingly, the center portion removed from one treat is part of a mixture that forms the filling for one or more other pet treats 100.

The opening 103 is then filled with an inner filling 110'. The composition used for the filling may be any desirable formulations including but not limited to those previously described. The filling is placed in the opening 103 and is flattened out to fill the opening and be substantially flat with the top surface of the outer portion 101'.

The uncooked treat is then dried to provide a dried treat ready for consumption. The drying process dries both the inner portion 110 and the outer portion 101. Typically, the treat is dried by oven-baking. Raising the temperature of the uncooked treat to solidify the treat and has a further benefit of killing unwanted bacteria, such as salmonella, germs, microbes, and pathogens. The treat is heated to a temperature for a particular amount of time suitable to solidify the treat and kill unwanted bacteria, germs, microbes, and pathogens. Typically, a treat would be heated for a longer time in a lower-temperature oven or a shorter time in a higher-temperature oven. In one illustrative method, the treat can be heated to a relatively low temperature for an extended period of time to physically affect the composition of the treat and later to a relatively high temperature for a short time to kill and unwanted bacteria, germs, microbes, and pathogens associated with the meat. The specific time and temperature settings are not believed to be critical as long as they are of an amount suitable to chemically affect the composition of the treat and to kill unwanted bacteria, germs, microbes, and pathogens associated with the meat.

Figure 3:
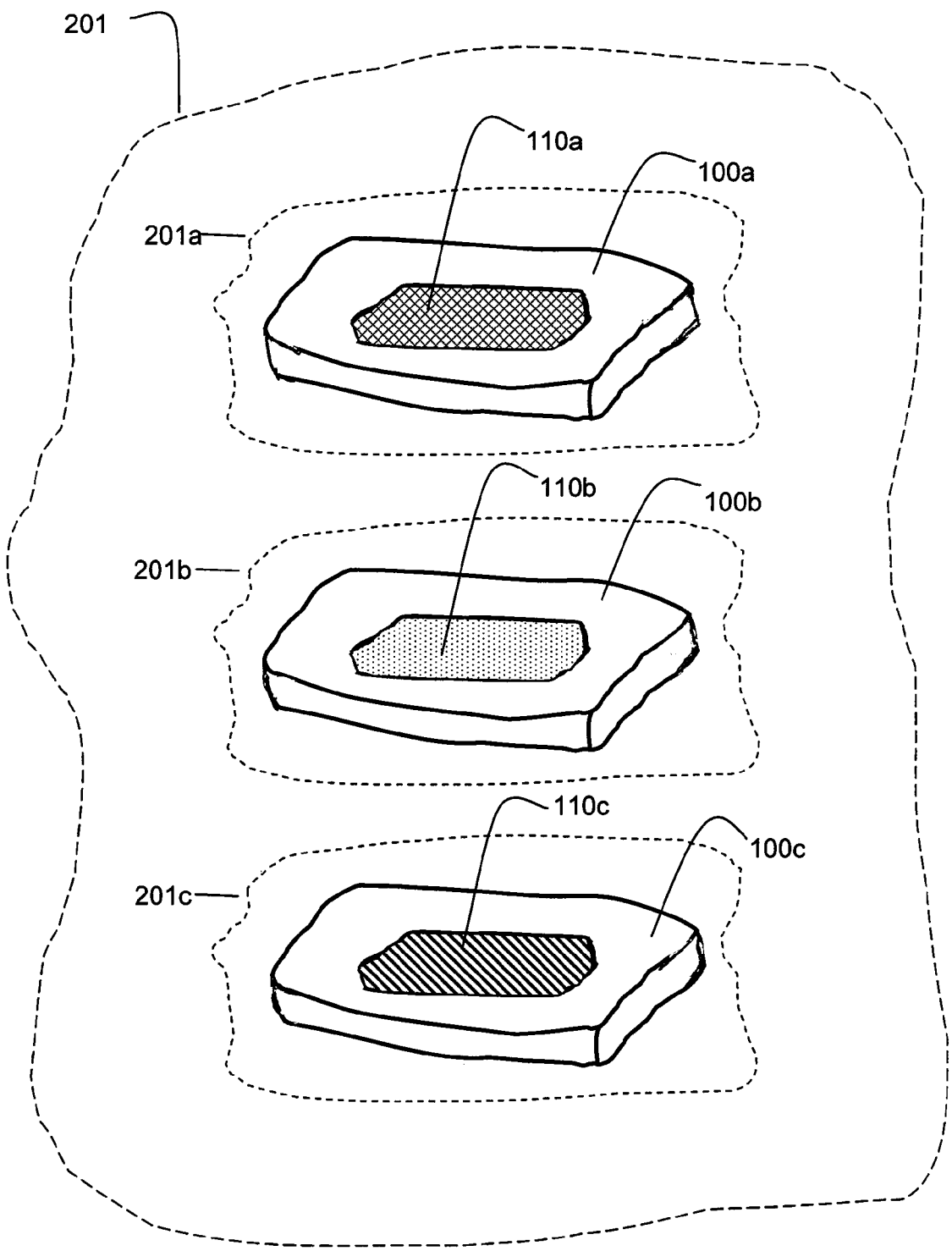
FIG. 3 schematically illustrates a set of pet treats including a plurality of variations of the pet treat shown in FIG. 1A.

FIG. 3 depicts variants in the packaging of the pet treat 100. In one arrangement, multiple treats 100a, 100b, and 100c may be in a common package 201 being directly adjacent to, and capable of touching, each other. The package 201 may therefore contain multiple treats where each treat has different varieties of the pet treats 110a, 110b, and 110c based on the filling composition to achieve desired properties. These may also have a materially different appearance; e.g. each of 110a, 110b, and 110c and such may be based on their respective inclusion an inner filling of a different color. As previously described, the pet owner may distinguish between these pet treat variations based on the color of the inner filling.

If desired, instead of the pet treat variations 100a, 100b, and 100c being directly adjacent and capable of touching each other, each treat variation 100a, 100b, and 100c may be individually packaged in a package, e.g., 201a, 201b, and 201c, based on their flavor/additive variation. The smaller packages 201a, 201b, and 201c may be contained within a larger package 201. Regardless of the packaging variant, the color distinguishing properties helps the pet owner avoid confusion to select the desired treat variant.

As defined herein, materially different health ingredients means that the inner filling of at least two treats have different health ingredients. Where multiple health ingredients are present in each of the two treats, the treats do not contain any of the same health ingredients. As defined herein, materially different flavor ingredients means that the inner filling of at least two treats have different flavor ingredients. As defined herein, materially different appearances means that the inner filling of at least two treats contain colorants of different color.

While particular embodiments of the invention have been shown and described, it is recognized that various modifications thereof will occur to those skilled in the art. For example, aspects of the disclosure directed to treats apply equally to treats for pet animals, wild animals, and to treats for human consumption. Therefore, the scope of the herein-described invention shall be limited solely by the claims appended hereto.

What is claimed is:

1. An edible pet treat comprising:
an outer unitary piece of meat having an unbroken outer perimeter and an opening extending therethrough defining an inner perimeter; and
an inner filling attached to the inner perimeter,
wherein the outer unitary piece of meat is a single piece of meat which is not mixed with any other substances, and
wherein the edible pet treat has a moisture content of less than 20%.

2. The edible pet treat of claim 1, wherein the inner filling includes peanut butter.

3. The edible pet treat of claim 1, wherein the inner filling includes a health ingredient selected from the group consisting of: glucosamine, chondroitin, flax seed, calcium, parsley seed, peppermint, vitamin E, L-carnitine, and lycopene, and mixtures thereof.

4. The edible pet treat of claim 1, wherein the inner filling includes at least 75% ground meat by weight.

5. The edible pet treat of claim 1,
wherein the edible pet treat has a length, a width substantially perpendicular to the length, a thickness substantially perpendicular to both the length and the width, and a surface area defined as the length multiplied by the width,
wherein a square root of the surface area of the edible pet treat is at least eight times the thickness of the edible pet treat, and
wherein the outer unitary piece of meat is a single piece of chicken meat.

6. The edible pet treat of claim 5, wherein the inner filling includes at least 75% ground meat by weight and at least one additional ingredient selected from a flavor ingredient and, intermixed with the ground meat, one or more health ingredients selected from the group consisting of: glucosamine, chondroitin, flax seed, calcium, parsley seed extract, peppermint, vitamin E, L-carnitine, and lycopene, and mixtures thereof.

7. The edible pet treat of claim 6, wherein the additional ingredient is a flavor ingredient selected from the group consisting of: cheese, peanut butter, and sweet potato.

8. The edible pet treat of claim 6, wherein the ground meat of the inner filling is selected from the group consisting of: pork, chicken, beef, lamb, and mixtures thereof.

9. The edible pet treat of claim 1,
wherein the outer unitary piece of meat is comprised of a meat chip having an open center portion, and
wherein a perimetral boundary of the open center portion forms the inner perimeter of the outer unitary piece of meat.

10. The edible pet treat of claim 5, wherein the single piece of chicken meat is attached to the inner filling at least in part by dried collagen having a moisture content of less than 20% and glycerine.

11. The edible pet treat of claim 1, further having an average thickness in the range of 0.1 cm to 1.0 cm.

12. The edible pet treat of claim 11, further having an average length in the range of 14 cm to 20 cm and an average width in the range of 3 cm to 9 cm.

13. The edible pet treat of claim 1, wherein the edible pet treat has a moisture content in the range of 7% to 12%.

14. The edible pet treat of claim 1, wherein the edible pet treat is rectangular.

15. A package comprising a first edible pet treat and a second edible pet treat, each of the first edible pet treat and the second edible pet treat comprising:
an outer unitary piece of meat having an unbroken outer perimeter and an opening extending therethrough defining an inner perimeter, and
an inner filling attached to the inner perimeter,
wherein the outer unitary piece of meat of each of the first edible pet treat and the second edible pet treat is a single piece of meat which is not mixed with any other substances,
wherein each of the first edible pet treat and the second edible pet treat has a moisture content of less than 20%, and
wherein the inner filling of the first edible pet treat and the inner filling of the second edible pet treat have materially different health ingredients or materially different flavor ingredients.

16. The package of claim 15, wherein the inner filling of the first edible pet treat further comprises a first colorant and the inner filling of the second edible pet treat further comprises a second colorant, wherein the first colorant and the second colorant are different colors.

17. The package of claim 15, wherein the first edible pet treat and the second edible pet treat each has an average thickness in the range of 0.1 cm to 1.0 cm.

18. The package of claim 17, wherein the first edible pet treat and the second edible pet treat each has an average length in the range of 14 cm to 20 cm and an average width in the range of 3 cm to 9 cm.

19. An edible pet treat comprising:
an outer unitary meat chip having an outer perimeter and an open center portion extending therethrough defining an inner perimeter; and
an inner filling attached to the inner perimeter,
wherein the outer unitary meat chip is a single piece of meat which is not mixed with any other substances,
wherein the edible pet treat has a moisture content of less than 20%, and
wherein the outer unitary meat chip has an unbroken outer perimeter and an unbroken inner perimeter.

* * * * *